US012039168B2

(12) United States Patent
Chandrashekhara et al.

(10) Patent No.: US 12,039,168 B2
(45) Date of Patent: Jul. 16, 2024

(54) MULTIPLE VERSION WRITE PENDING SUPPORT IN SHARED GLOBAL MEMORY

(71) Applicant: Dell Products, L.P., Hopkinton, MA (US)

(72) Inventors: Sandeep Chandrashekhara, Shrewsbury, MA (US); Mark Halstead, Holliston, MA (US); Michael Ferrari, Douglas, MA (US); Rong Yu, West Roxbury, MA (US); Michael Scharland, Franklin, MA (US)

(73) Assignee: Dell Products, L.P., Hopkinton, MA (US)

( * ) Notice: Subject to any disclaimer, the term of this patent is extended or adjusted under 35 U.S.C. 154(b) by 62 days.

(21) Appl. No.: 17/965,841

(22) Filed: Oct. 14, 2022

(65) Prior Publication Data

US 2024/0126437 A1    Apr. 18, 2024

(51) Int. Cl.
*G06F 3/06* (2006.01)
(52) U.S. Cl.
CPC ............ *G06F 3/061* (2013.01); *G06F 3/0659* (2013.01); *G06F 3/0673* (2013.01)
(58) Field of Classification Search
CPC .......... G06F 3/06; G06F 3/0659; G06F 3/061; G06F 3/0673
See application file for complete search history.

(56) References Cited

U.S. PATENT DOCUMENTS

| | | | | |
|---|---|---|---|---|
| 7,617,372 B1 * | 11/2009 | Bjornsson | ........... | G06F 12/0866 711/144 |
| 8,843,714 B1 * | 9/2014 | Smirnov | ............. | G06F 11/3485 711/100 |
| 9,927,980 B1 * | 3/2018 | LeCrone | ............. | G06F 11/1456 |
| 10,031,693 B1 * | 7/2018 | Bansode | ................. | G06F 3/065 |
| 11,765,407 B2 * | 9/2023 | Denoual | ............. | H04N 21/816 725/116 |
| 2015/0177988 A1 * | 6/2015 | Rozental | ............... | G06F 3/0607 711/103 |
| 2018/0217766 A1 * | 8/2018 | Bansode | ............... | G06F 3/0689 |

(Continued)

FOREIGN PATENT DOCUMENTS

| | | | | |
|---|---|---|---|---|
| EP | 1671231 B1 * | 11/2019 | ............... | G06F 1/12 |
| WO | WO-2016127658 A1 * | 8/2016 | ............... | G06F 3/06 |

OTHER PUBLICATIONS

Hairong Kuang, L. F. Bic and M. B. Dillencourt, "GIDM: globally-indexed distributed memory," The Ninth IEEE Workshop on Future Trends of Distributed Computing Systems, 2003. FTDCS 2003. Proceedings., San Juan, PR, USA, 2003, pp. 108-114.*

(Continued)

*Primary Examiner* — Pierre Michel Bataille
(74) *Attorney, Agent, or Firm* — Anderson Gorecki LLP

(57) ABSTRACT

A storage system is configured to accept subsequent versions of write data on a given track to multiple respective slots of shared global memory. A track index table presents metadata at the track level, and can hold up to N slots of data. All slots of shared global memory holding data owed to the source volume and to snapshots of the source volume are bound to the track in the track index table. Each time a write occurs on a track, the track index table is used to determine when a write pending slot for the track is owed to a snapshot copy of the storage volume. When a write pending slot contains data that is owed to a snapshot copy of the source volume, a new slot is allocated to the write IO and bound to the track in the track index table.

17 Claims, 6 Drawing Sheets

(56) References Cited

U.S. PATENT DOCUMENTS

| | | | |
|---|---|---|---|
| 2019/0179771 A1* | 6/2019 | Ward | G06F 3/0619 |
| 2019/0212944 A1* | 7/2019 | Hutchison | G06F 3/0659 |
| 2019/0340292 A1* | 11/2019 | Chandrashekhara ... | G06F 3/065 |
| 2020/0014688 A1* | 1/2020 | Kohli | H04L 9/0891 |
| 2022/0043573 A1* | 2/2022 | Sanchez | G06F 3/0644 |

OTHER PUBLICATIONS

A. Brinkmann, S. Effert, M. Heidebuer and M. Vodisek, "Realizing Multilevel Snapshots in Dynamically Changing Virtualized Storage Environments," International Conference on Systems and International Conference on Mobile Communications and Learning Technologies Morne, Mauritius, 2006, pp. 26-26.*

Naama Ben-David, "Multiversion Concurrency with Bounded Delay and Precise Garbage Collection", Carnegie Mellon University, May 17, 2019.*

Z. Wang et al., "NVOverlay: Enabling Efficient and Scalable High-Frequency Snapshotting to NVM," 2021 ACM/IEEE 48th Annual International Symposium on Computer Architecture (ISCA), Valencia, Spain, 2021, pp. 498-511.*

Ben-David, Naama, "Multiversion Concurrency with Bounded Delay and Precise Garbage Collection", Carnegie Mellon University, arxiv.org, May 2019.*

L. Cui, Z. Hao, L. Li and X. Yun, "SnapFiner: A Page-Aware Snapshot System for Virtual Machines," in IEEE Transactions on Parallel and Distributed Systems, vol. 29, No. 11, pp. 2613-2626, Nov. 1, 2018.*

S. Shepler • M. Eisler • D. Noveck, "Network File System (NFS) Version 4 Minor Version 1 Protocol", IP.com Prior Art Database Technical Disclosure, 2010.*

* cited by examiner

FIG. 6

| | | Track Index Table 180 | |
|---|---|---|---|
| Track #1 | Slot Number | Slot type | Track level sequence number |
| | Slot Number | Slot type | Track level sequence number |
| | Slot Number | Slot type | Track level sequence number |
| | Slot Number | Slot type | Track level sequence number |
| Track #2 | Slot Number | Slot type | Track level sequence number |
| | Slot Number | Slot type | Track level sequence number |
| | Slot Number | Slot type | Track level sequence number |
| Track #3 | Slot Number | Slot type | Track level sequence number |
| | Slot Number | Slot type | Track level sequence number |
| | Slot Number | Slot type | Track level sequence number |
| | Slot Number | Slot type | Track level sequence number |
| ⋮ | | | |
| Track #M | Slot Number | Slot type | Track level sequence number |
| | Slot Number | Slot type | Track level sequence number |
| | Slot Number | Slot type | Track level sequence number |
| | Slot Number | Slot type | Track level sequence number |

MULTIPLE VERSION WRITE PENDING SUPPORT IN SHARED GLOBAL MEMORY

FIELD

This disclosure relates to computing systems and related devices and methods, and, more particularly, to a method and apparatus for source volume write IO performance improvement using multiple version write pending support in shared global memory.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

A snapshot copy of a source volume is a copy of the source volume as the source volume existed at a particular point in time. In some applications, it is necessary to create snapshots of a source volume frequently, for example every minute or every five minutes. However, in this environment, when a write operation occurs on a track of a source volume that is write pending, the previous version of the track is possibly owed to a snapshot copy and must be preserved. One way to preserve the previous version of the track it to implement a local replication intercept process, to copy the current source data into a snapshot replication area before accepting the new data and acknowledging the write IO to the host. This intercept handling impacts write IO performance both in terms of response rate and throughput on the source.

According to some embodiments, the front-end adapter of a storage system is configured to improve the source write IO performance by providing the ability to accept write data on a track to N number of versioned slots of shared global memory, without requiring the implementation of a synchronous/real time intercept process to copy previous data for the track that is owed to a snapshot to a snapshot replication area. In some embodiments, N=4, although other numbers of versioned slots may be used.

A track index table presents the metadata at the track level, and can hold up to the N slots of data. All slots holding data owed to the source volume and to snapshots of the source volume are bound to the track in the track index table. Each entry of the track index table identifies the track and any slots of shared global memory that are bound to the track. The source volume is assigned a device level sequence number. Each time a snapshot of the source volume is activated, the device level sequence number of the source volume is incremented. Each time a write occurs on the track, the slot that is bound to the write data in the track index table is assigned a track a track level sequence number that is set to equal the device level sequence number of the source volume at the time of the write operation. When a write occurs on a track, and a bound slot has a track level sequence number that is less than the current device level sequence number of the source volume, the bound slot contains data that is owed to a snapshot and is preserved.

Slots that are bound to a track in the track index table that are owed to a snapshot are either Version Write Pending (VWP) or Protected Write Pending (PWP). As used here, the term "Version Write Pending" is used to refer to a slot that contains data that is write pending to its track, but the data on disk (or the mix of on-disk and older slot data) is owed to a snapshot copy. As used herein, the term "Protected Write Pending" is used to refer to a slot that contains data that is owed only to a snapshot copy, and as such the slot does not hold any data that is owed to the track to which the PWP slot is bound. By providing multi-version write pending support, which enables a write IO on a track to be accepted directly into a slot of shared global memory regardless of whether there are other slots that are currently bound to the track with a the state of Write Pending (WP), VWP, or PWP, it is possible to avoid use of a synchronous intercept process in many instances. As such, providing multi-version write pending support makes it possible to improve write IO performance on a source volume in terms of both response rate and throughput on the source volume in environments where snapshots are being created on the source volume.

BRIEF DESCRIPTION OF THE DRAWINGS

FIG. 6 is a functional block diagram of an example data structure used to implement a track index table configured to implement multi-version write pending support, according to some embodiments.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
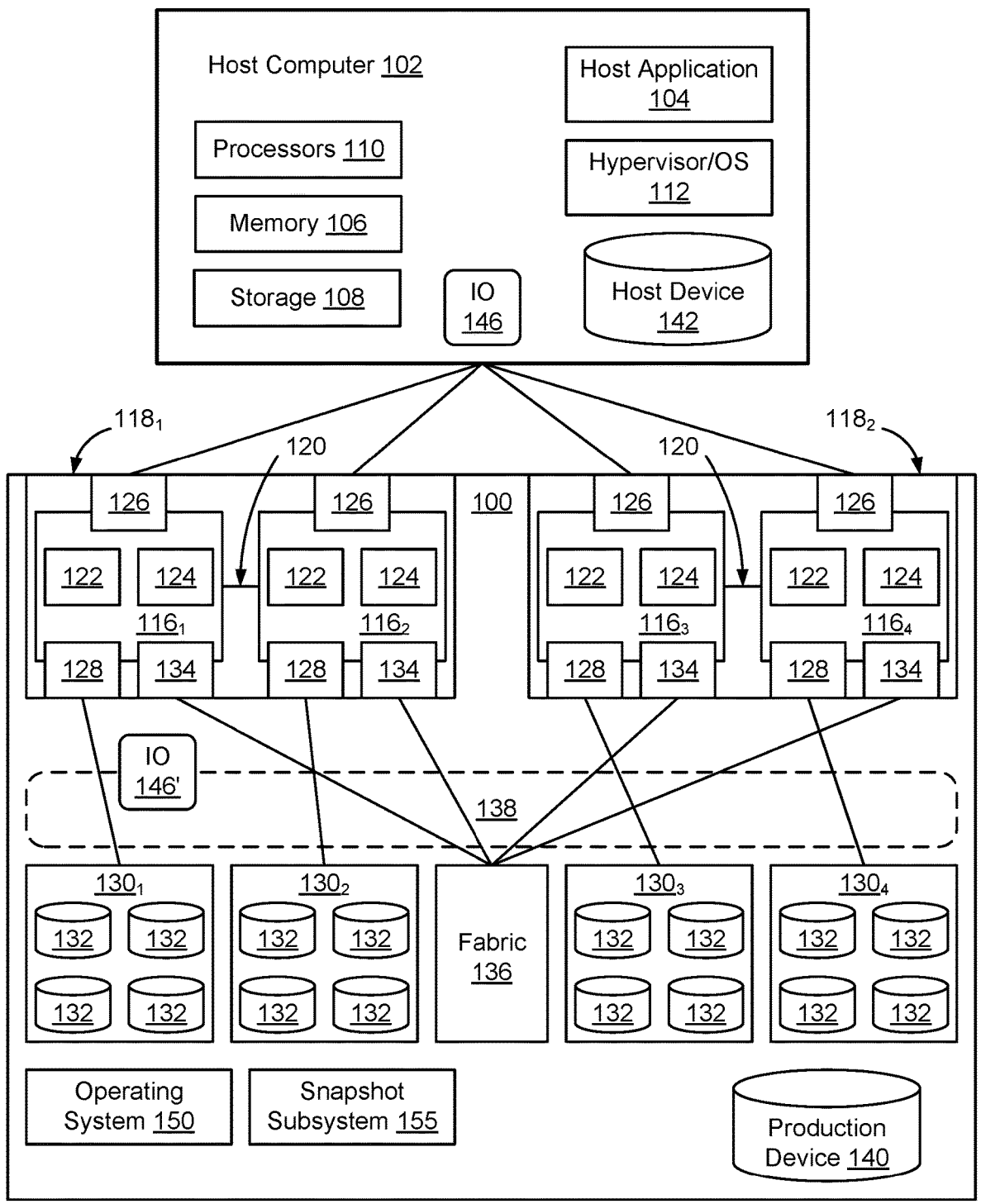
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g., including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g., via DMA (Direct Memory Access) or RDMA (Remote Direct Memory Access).

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host volatile memory 106. When that is not possible then the IO 146 is sent to one of the compute nodes 116 to be serviced by the storage system 100.

In the case where IO 146 is a read command, the storage system 100 uses metadata to locate the commanded data, e.g., in the virtual shared global memory 138 or on managed drives 132. When the commanded data is not in the virtual shared global memory 138, then the data is temporarily copied into the virtual shared global memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared global memory 138, marks the data as dirty, and creates new metadata that maps the address of the data on the production device 140 to a location to which the block is written on the managed drives 132.

As used herein, the term "snapshot" is used to refer to a copy of a source volume as the source volume existed at a particular point in time. For example, in some embodiments the storage system 100 includes a snapshot subsystem 155 configured to create snapshot copies of source volumes. Once a snapshot copy is created, the snapshot copy preserves the data of the source volume as the data of the source volume existed at the point in time when the snapshot was created.

When a host issues a write operation on a track of a source volume, the write IO is allocated a slot in global memory 138 where the data resides until the data can be "destaged" to back-end storage resources. As used herein, the term "destage" is used to refer to the process of moving data from a slot of shared global memory to the back-end storage resources such as managed drives 132. While the data is contained in shared global memory, the track is "write pending".

In some applications, it is necessary to create snapshots of a source volume frequently, for example every minute or every five minutes. However, in this environment, when a write operation occurs on a track of a source volume that is currently write pending and is owed to a snapshot, a local replication intercept process was conventionally used to preserve the copy of the track that was owed to the snapshot. Specifically, in implementations that do not provide multi-version support, a track of data is allocated a single slot of global memory. When a write to a track occurs, and the track is currently write pending in global memory, it was necessary to copy the current source data from the slot of global memory that was allocated to the track into a snapshot replication area, before accepting the new data into the slot of global memory allocated to the track. By copying the current source data into a snapshot replication area, it is possible to preserve the current version of the data of the track for any snapshot that requires the current version of the track of data. However, since the intercept process requires a finite amount of time, and must be done before acknowledging the write IO to the host, this process negatively impacts write IO performance both in terms of response rate and throughput on the source. In environments where snapshots are being created frequently, it becomes more likely that writes to a given track might be associated with data that is owed to a snapshot copy.

According to some embodiments, the front-end adapter 126 of a storage system 100 is configured to improve the source write IO performance by providing the ability to accept a write IO on a given track to N number of versioned slots of shared global memory 138, without going through the synchronous/real time intercept process whenever a write IO occurs on a track that is write pending. In some embodiments, N=4, although other numbers of versioned slots may be used. A track index table (TID) 180 (see FIG. 6) presents the metadata of the source volume at the track level, and can hold up to the N slots of data. All slots holding data owed to the snapshots are bound to the track in the track index table 180.

In some embodiments, slots involved in snapshot versions are either Version Write Pending (VWP) or Protected Write Pending (PWP). As used here, the term "Version Write Pending" is used to refer to a slot that contains data that is write pending to its track, but the data on disk (or the mix of on-disk and older slot data) is owed to a snapshot copy. As used herein, the term "Protected Write Pending" is used to refer to a slot that contains data that is only owed to a snapshot copy, and does not hold any data owed to the track to which the PWP slot is bound. By providing multi-version write pending support to enable a write IO on a track to be accepted directly into a slot of shared global memory, regardless of whether the track is in a No Write Pending (No WP), Write Pending (WP), VWP, or PWP, without always requiring use of a synchronous intercept process, it is possible to improve write IO performance on a source volume, in terms of both response rate and throughput, particularly in environments where frequent snapshots are being activated on the source volume.

Figure 2:
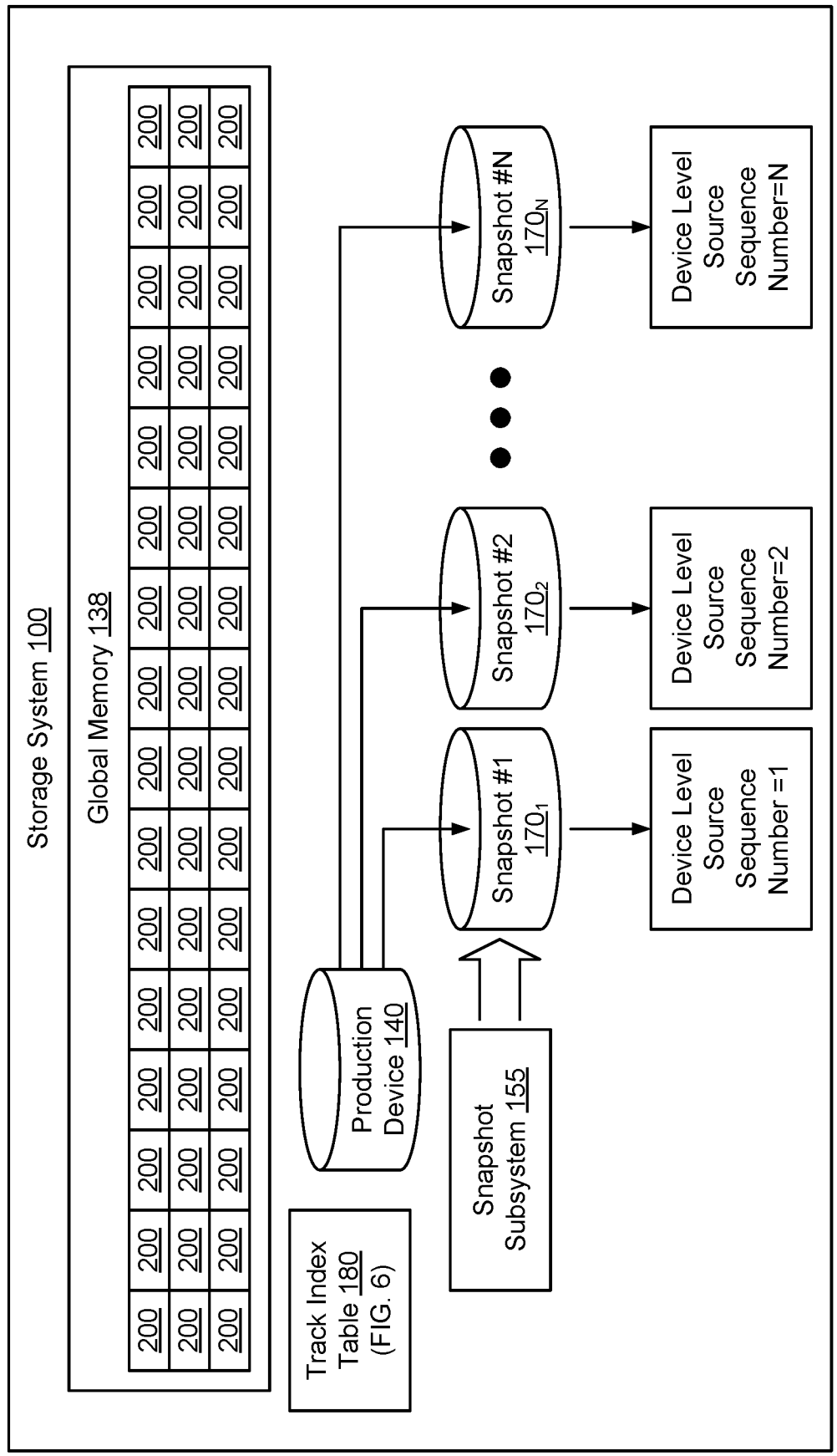
FIG. 2 is a functional block diagram of an example storage system showing aspects of the snapshot processing system configured to enable multi-version write pending support, according to some embodiments.

FIG. 2 is a functional block diagram of an example storage system showing aspects of the snapshot processing system configured to enable multi-version write pending support, according to some embodiments. As shown in FIG. 2, in some embodiments the storage system 100 includes global memory 138. When a host write IO is received by the front-end adapter 126 on production device 140, the front-end adapter 126 allocates a slot 200 of global memory 138 and stores the data in the allocated slot 200.

In some embodiments, the front-end adapter maintains a track index table 180 an example of which is shown in FIG. 6. The track index table 180 enables the front-end adapter 126 to keep track of multiple slots 200 for each track, to enable multiple versions of the track to be maintained in global memory 138. This enables, for example, versions of the track that are owed to particular snapshots to be retained in global memory 138 without requiring the data that is owed to a snapshot to be moved to a snapshot replication area before a new write to the track is accepted into global memory 138.

In some embodiments, a track is considered a minimum unit of granularity for preserving point-in-time data. The size of a track will depend on the implementation, and may be, for example, a 128 KB extent of data. Other track sizes might be 8 KB, 16 KB, or another size, depending on the implementation.

To enable multi-version write pending support, in some embodiments two values are used to manage data for block-based shapshot volumes—a device level sequence number of the source volume and a track level sequence number that is assigned to a slot at the time a write IO on a track occurs. The device level sequence number of the source volume is incremented each time a snapshot is activated. All write operations that occur on the source volume are assigned a track level sequence number that is set to be equal to the current device level sequence number of the source volume at the time that the write IO occurred. When a write to a track is received by the front-end adapter, the front-end adapter checks the track index table to determine whether there are any slots of global memory that have been bound to the track and which have a track sequence number that is less than the current device level sequence number of the source volume. When the track sequence number of any of the slots that is bound to the track is less than the current device level sequence number of the source volume, the slot contains data that is owed to a snapshot. Accordingly, in this situation, the new write needs to go through either the "create version WP" flow (see FIG. 5) or the "real time intercept" flow (see FIG. 4).

According to some embodiments, when a write IO is received on a track, and the track is not a WP or VWP, the front-end adaptor directly accepts data into new VWP slot, saves the current track sequence into a slot record of the track index table, and sets the track sequence number of the new VWP slot to match the current value of the device level sequence number of the source volume in the track index table.

When the track is Write Pending (WP), the front-end adaptor allocates a new VWP slot and copies current WP content into this slot. It saves the existing (track sequence—1) into current slot record and converts it into PWD slot. Then it accepts data into a new VWP slot, saves the current track sequence into the slot record, and sets the track sequence number of the new VWP slot to match the current value of the device level sequence number of the source volume.

When the track is VWP, the front-end adaptor allocates a new VWP slot and copies current VWP content into this slot and converts old VWP slot to PWD. Then it accepts data into a new VWP slot and saves the current track sequence into the slot record and sets the track sequence number of the new VWP slot to match the current value of the device level sequence number of the source volume.

In some embodiments, there is a maximum number of slots that can be bound to a given track in the track index table. For example, in some embodiments the track index table will allow a maximum of four slots to be bound to a given track, although other embodiments may implement other maximum numbers of slots. When the maximum number of slots that may be bound to a given track in the track index table is reached, in some embodiments when there are not enough room for new VWP slots, then the host write will go through the real intercept process shown in FIG. 4 to save the current source data of one of the bound slots into the snapshot replication area before accepting the new write.

Figure 3:
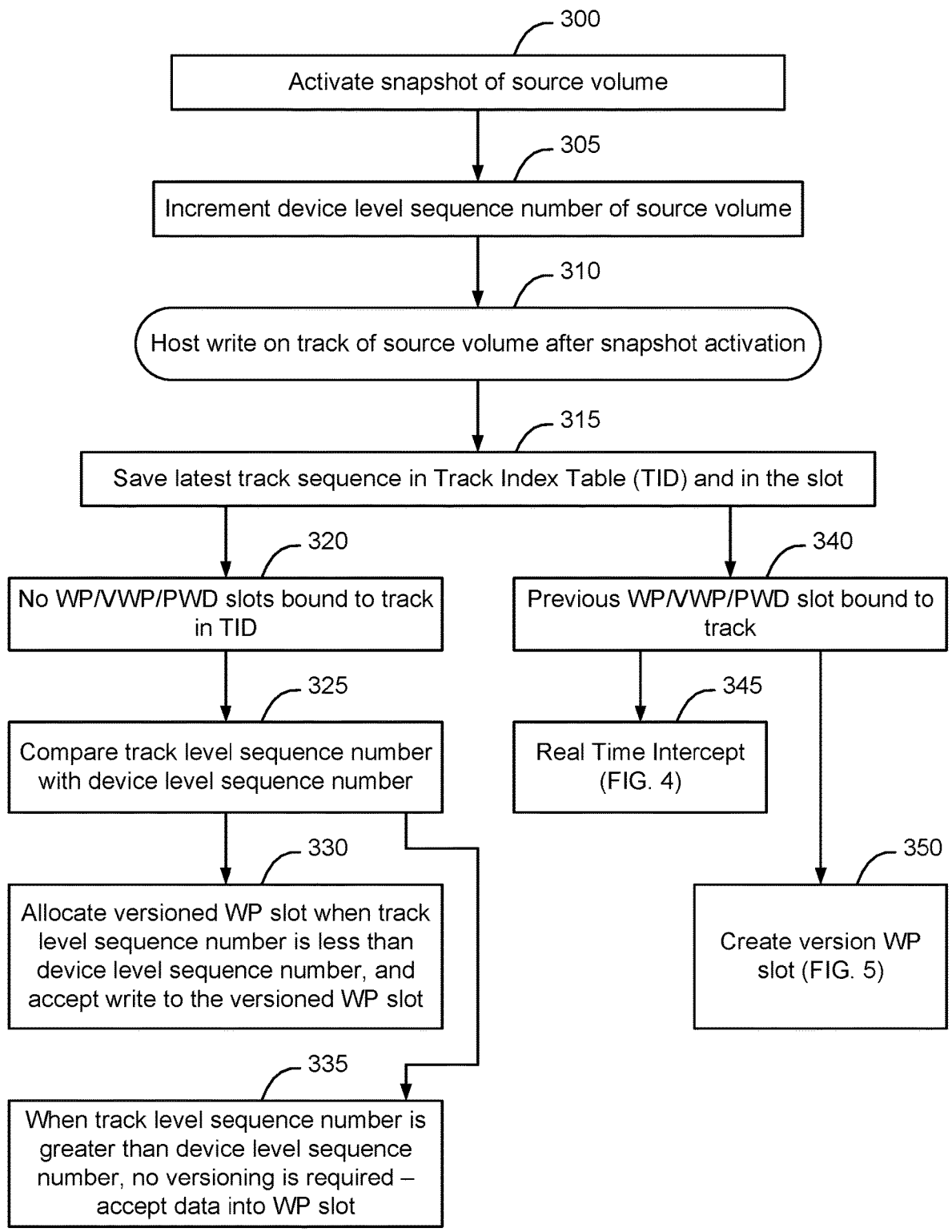
FIG. 3 is a flow chart of an example process of implementing a write IO on a source volume in a storage system configured to implement multi-version write pending support, according to some embodiments.

FIG. 3 is a flow chart of an example process of implementing a write IO on a source volume in a storage system configured to implement multi-version write pending support, according to some embodiments. As shown in FIG. 3, in some embodiments when a snapshot of a source volume is activated (block 300), the device level sequence number of the source volume is incremented (block 305). After incrementing the device level sequence number of the source volume, all subsequent writes to tracks of the source volume will be assigned a track level sequence number equal to the current device level sequence number of the source volume. Specifically, all new writes on the source volume will have a track level sequence number set to be equal to the current device level sequence number of the source volume.

When a host write on a track occurs after snapshot activation (block 310), the latest track sequence for the track is saved in the track index table (TID) and in the slot (block 315). The front-end adapter checks the track index table to determine whether there are other slots currently bound to the track that are write pending. When there are no other slots currently bound to the track in the track index table that are WP, VWP, or PWP (block 320) the front-end adapter compares a track level sequence number with the device level sequence number (block 325). When the track level sequence number is less than the device level sequence number, a versioned WP slot is allocated to the track and the write is accepted to the versioned WP slot (block 330). When the track level sequence number is greater than the device level sequence number, no versioning is required and the write is accepted to the WP slot (block 335).

Figure 4:
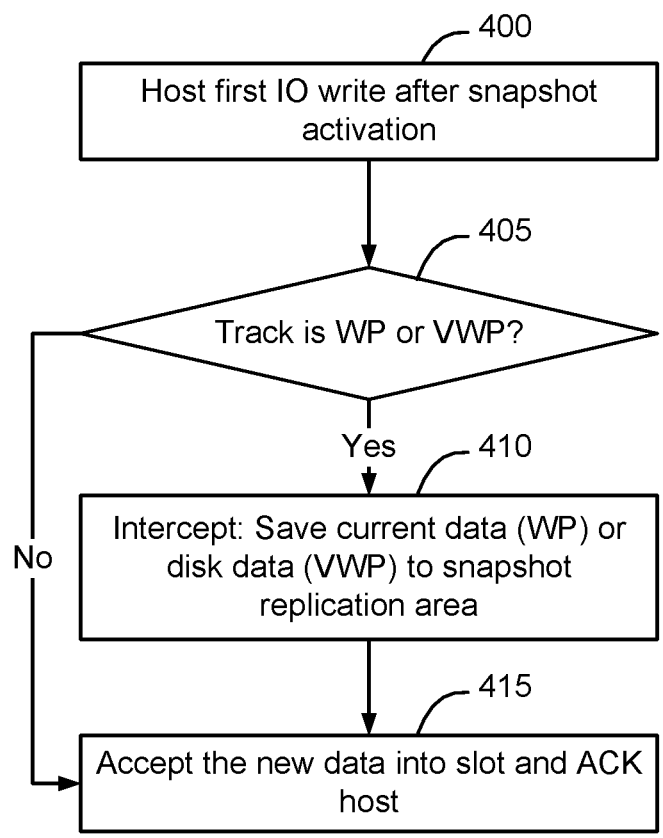
FIG. 4 is a flow chart of an example real time intercept process, according to some embodiments.
Figure 5:
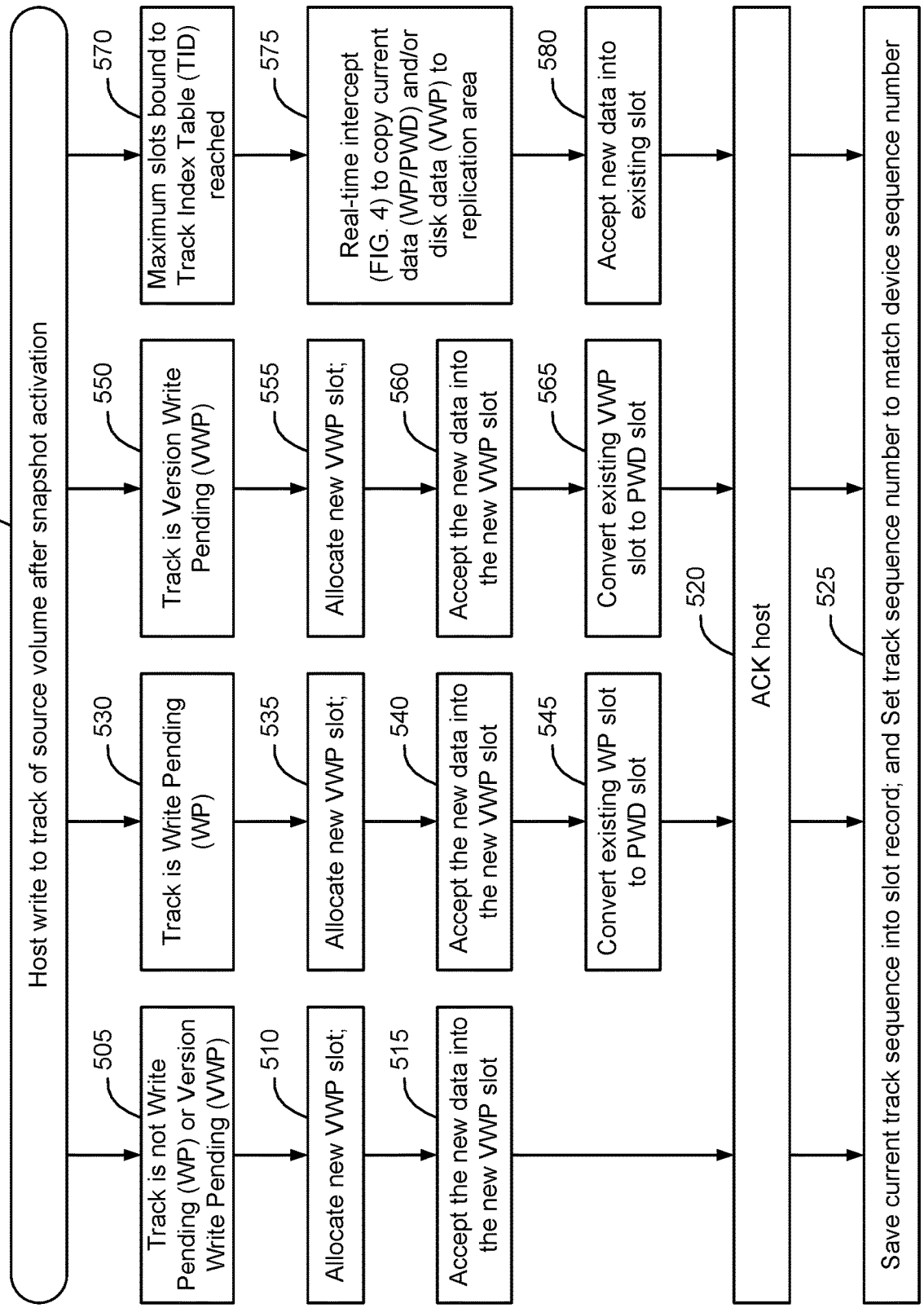
FIG. 5 is a flow chart of an example process of implementing a host write to a source volume in a storage system configured to implement multi-version write pending support, according to some embodiments.

When there are other slots currently bound to the track that are WP, VWP, or PWP (block 340), the real-time intercept process of FIG. 4 is used to implement the write IO (block 345) or the create version write pending process of FIG. 5 is used to implement the write IO (block 350). The real-time intercept process of FIG. 4 may be used, for example, in situations where the maximum number of slots N have been bound to the track in the track index table. The write IO is acknowledged to the host, and the process ends.

FIG. 4 is a flow chart of an example real time intercept process, according to some embodiments. As shown in FIG. 4, in some embodiments when a host write after snapshot activation occurs on a track (block 400), a determination is made as to whether the write will occur on a slot that contains data for the track that is write pending or version write pending (block 405). When the track index table does not indicate that the slot to be used for the write IO is write pending or version write pending (a determination of NO at block 405) the new data is accepted into the slot and a write IO acknowledgment message is sent to the host (block 415).

When the track index table indicates that the slot to be used for the write IO is write pending or version write pending (a determination of YES at block 405), a real-time intercept process is implemented to move the data from the bound slot of global memory to a snapshot replication area (block 410). The manner in which the intercept process moves data from the current slot of global memory to snapshot replication area is well known and, as such, is not described in greater detail. Once the data that is currently stored in the slot of global memory has been moved to the snapshot replication area (block 410), the new data is accepted into the slot and a write IO acknowledgment message is sent to the host (block 415).

FIG. 5 is a flow chart of an example process of implementing a host write to source volume in a storage system configured to implement write IO operations to shared global memory using multi-version write pending support, according to some embodiments. As shown in FIG. 5, when a host write to a track of a source volume occurs after snapshot activation (block 500), the process used by the host adapter to manage the write IO depends on the content of the track index table 180. For example, when the host adapter checks the track index table 180 and determines that the entry of the track index table for the track does not have any slots bound to the track that are write pending or version write pending (block 505), the host adapter allocates a new slot to the track (block 510). The host adapter accepts the new data into the newly allocated slot, binds the allocated slot to the track in the track index table, and marks the slot version write pending in the track index table (block 515). The host adapter then acknowledges the write IO to the host (block 520), saves the current track sequence into the slot record for the track in the track index table, and sets the track sequence number of the newly allocated slot to match the current device level sequence number of the source volume (block 525).

When the host adapter checks the track index table and determines that the entry of the track index table for the track has a slot that is bound to the track that is Write Pending (WP) (block 530), the host adapter allocates a new slot to the track (block 535). The host adapter accepts the new data into the newly allocated slot, binds the allocated slot to the track in the track index table, and marks the newly allocated slot Version Write Pending in the track index table (block 540). The host adapter also converts the existing Write Pending (WP) slot to a PWP slot by changing the designation of the slot to Protected Write Pending (PWP) in the track index table (block 545). The host adapter then acknowledges the write IO to the host (block 520), saves the current track sequence into the slot record for the track in the track index table, and sets the track sequence number of the newly allocated slot to match the current device level sequence number of the source volume (block 525).

When the host adapter checks the track index table and determines that the entry of the track index table for the track has a slot that is bound to the track that is Version Write Pending (VWP) (block 550), the host adapter allocates a new slot to the track (block 555). The host adapter accepts the new data into the newly allocated slot, binds the allocated slot to the track in the track index table, and marks the newly allocated slot Version Write Pending in the track index table (block 560). The host adapter also converts the existing Version Write Pending (VWP) slot to a PWP slot by changing the designation of the slot to Protected Write Pending (PWP) in the track index table (block 565). The host adapter then acknowledges the write IO to the host (block 520), saves the current track sequence into the slot record for the track in the track index table, and sets the track sequence number of the newly allocated slot to match the current device level sequence number of the source volume (block 525).

When the host adapter checks the track index table and determines that the entry of the track index table for the track has already reached the maximum number of slots that can be bound to the track (block 570), the host adapter is not able to bind an additional slot to the track in the track index table. Accordingly, in some embodiments the host adapter implements the real time intercept process described above in connection with FIG. 4 to copy the current data and/or disk data of one of the bound slots to the snapshot replication area (block 575) prior to accepting the new data into an existing slot for the track (block 580). After the real-time intercept process has completed, the host adapter acknowledges the write IO to the host (block 520), saves the current track sequence into the slot record for the track in the track index table, and sets the track sequence number to match the current device level sequence number of the source volume (block 525).

FIG. 6 is a functional block diagram of an example data structure used to implement a track index table 180 configured to implement multi-version write pending support, according to some embodiments. As shown in FIG. 6, in some embodiments each track in the track index table 180 is able to be bound to a number N of slots 200 of global memory 138. Each slot that is bound to a particular track has a slot identifier, which is referred to in FIG. 6 as a "slot number". The particular way that the slot is identified will depend on the particular implementation. Each bound slot has a slot type that identifies the slot as either Write Pending, Version Write Pending, or Protected Write Pending. The slot also includes the track level sequence number.

In some embodiments, the track level sequence number is set to equal the device level sequence number of the source volume at the time that the write IO occurred. The device level sequence number of the source volume is incremented each time a snapshot is activated on the source volume. Accordingly, when the track level sequence number of the data stored in a particular slot is lower than the current device level sequence number of the source volume, that means that at least one snapshot has been activated on the source volume after the data was stored in the particular slot. As such, the data that is stored in the slot is owed to at least one snapshot and must be preserved.

By enabling the host adapter to implement multi-version write pending support, it is possible to enable multiple versions of the track to be maintained in slots of global shared memory 138 without requiring that a real-time intercept process to be used in all instances to preserve previous versions of tracks by moving the previous versions of the tracks to a snapshot replication area prior to writing the new IO data to shared global memory. This can accelerate write IO processing, particularly in situations where snapshots are occurring frequently which can result in an increased number of track write pending conflicts in shared global memory.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of enabling multi-version write pending support in shared global memory, comprising:
    maintaining a track index table, the track index table having a plurality of entries, each entry of the track index table identifying a respective track of data of a source volume, and at least some of the entries identifying two or more slots of the shared global memory that are simultaneously bound to the track in the track index table and contain different versions the track of data of the source volume that were written to the slots of the shared global memory at different points in time;
    receiving write operations on the tracks of data of the source volume; and
    each time a write operation is received on the source volume:
        determining from the track index table whether an entry of the track index table for the respective track of data of the source volume identifies a first slot of the shared global memory that is bound to the track;
        in response to a determination that the entry of the track index table for the respective track of data of the source volume identifies the first slot of the shared global memory that is bound to the track, determining whether the first slot of the shared global memory contains data that is owed to a snapshot copy of the source volume; and
        in response to a determination that the first slot of the shared global memory contains data that is owed to a snapshot copy of the source volume, allocating a second slot of the shared global memory for the write operation while keeping the data that is owed to the snapshot copy of the source volume in the first slot of the shared global memory;
    the method further comprising:
    determining from the track index table that an entry of the track index table for the respective track of data of the source volume does not identify any slot of the shared global memory that has a slot type of write pending, version write pending, or protected write pending that is bound to the track; and
    in response to a determination that the entry of the track index table for the respective track of data of the source volume does not identify any slot of the shared global memory that has a slot type of write pending, version write pending, or protected write pending that is bound to the track, comparing a track level sequence number of the track of data associated with the write operation with a device level sequence number of the source volume.

2. The method of claim 1, in response to determining that the track level sequence number of the track of data associated with the write operation is less than the device level sequence number of the source volume, allocating the second slot as a versioned write pending slot and accepting the write to the versioned write pending slot.

3. The method of claim 1, in response to determining that the track level sequence number of the track of data associated with the write operation is greater than or equal to the device level sequence number of the source volume, allocating the second slot as an un-versioned write pending slot and accepting the write to the un-versioned write pending slot.

4. The method of claim 1, wherein the track index table contains an entry for each track, each entry being configured to enable a maximum of N entries to be bound to the respective track in the track index table, N being an integer greater than two.

5. The method of claim 4, wherein allocating the second slot of the shared global memory for the write operation comprises:
    determining that the maximum number of N slots have been bound to the track in the track index table;
    in response to determining that the maximum number of N slots have been bound to the track in the track index table, initiating a real time-intercept process to copy current data from a selected one of the slots that is bound to the track in the track index table to a snapshot replication area; and
    accepting data of the write operation into the selected one of the slots.

6. The method of claim 1, wherein a slot type of version write pending identifies the slot as containing data that is write pending to its track, but the data on disk or a mix of on-disk and older slot data is owed to a snapshot copy of the source volume.

7. The method of claim 1, wherein a slot type of protected write pending identifies the slot as containing data that is owed only to a snapshot copy of the source volume, and does not hold any data owed to the track to which the PWP slot is bound.

8. A method of enabling multi-version write pending support in shared global memory, comprising:
    maintaining a track index table, the track index table having a plurality of entries, each entry of the track index table identifying a respective track of data of a source volume, and at least some of the entries identifying two or more slots of the shared global memory that are simultaneously bound to the track in the track index table and contain different versions the track of data of the source volume that were written to the slots of the shared global memory at different points in time;
    receiving write operations on the tracks of data of the source volume; and
    each time a write operation is received on the source volume:
        determining from the track index table whether an entry of the track index table for the respective track of data of the source volume identifies a first slot of the shared global memory that is bound to the track;
        in response to a determination that the entry of the track index table for the respective track of data of the source volume identifies the first slot of the shared global memory that is bound to the track, determining whether the first slot of the shared global memory contains data that is owed to a snapshot copy of the source volume; and
        in response to a determination that the first slot of the shared global memory contains data that is owed to a snapshot copy of the source volume, allocating a second slot of the shared global memory for the write operation while keeping the data that is owed to the snapshot copy of the source volume in the first slot of the shared global memory:

wherein allocating the second slot of the shared global memory for the write operation comprises:

determining that the first slot of the shared global memory has a slot type of write pending;

in response to determining that the first slot of the shared global memory has a slot type of write pending, setting a slot type of the second slot of the shared global memory to version write pending;

accepting data of the write operation into the second slot with the slot type set to version write pending; and converting the slot type of the first slot of the shared global memory from write pending to protected write pending.

9. The method of claim 8, wherein a slot type of version write pending identifies the slot as containing data that is write pending to its track, but the data on disk or a mix of on-disk and older slot data is owed to a snapshot copy of the source volume.

10. The method of claim 8, wherein a slot type of protected write pending identifies the slot as containing data that is owed only to a snapshot copy of the source volume, and does not hold any data owed to the track to which the PWP slot is bound.

11. The method of claim 8, wherein the track index table contains an entry for each track, each entry being configured to enable a maximum of N entries to be bound to the respective track in the track index table, N being an integer greater than two.

12. The method of claim 11, wherein allocating the second slot of the shared global memory for the write operation comprises:

determining that the maximum number of N slots have been bound to the track in the track index table;

in response to determining that the maximum number of N slots have been bound to the track in the track index table, initiating a real time-intercept process to copy current data from a selected one of the slots that is bound to the track in the track index table to a snapshot replication area; and accepting data of the write operation into the selected one of the slots.

13. A method of enabling multi-version write pending support in shared global memory, comprising:

maintaining a track index table, the track index table having a plurality of entries, each entry of the track index table identifying a respective track of data of a source volume, and at least some of the entries identifying two or more slots of the shared global memory that are simultaneously bound to the track in the track index table and contain different versions the track of data of the source volume that were written to the slots of the shared global memory at different points in time;

receiving write operations on the tracks of data of the source volume; and each time a write operation is received on the source volume:

determining from the track index table whether an entry of the track index table for the respective track of data of the source volume identifies a first slot of the shared global memory that is bound to the track;

in response to a determination that the entry of the track index table for the respective track of data of the source volume identifies the first slot of the shared global memory that is bound to the track, determining whether the first slot of the shared global memory contains data that is owed to a snapshot copy of the source volume; and in response to a determination that the first slot of the shared global memory contains data that is owed to a snapshot copy of the source volume, allocating a second slot of the shared global memory for the write operation while keeping the data that is owed to the snapshot copy of the source volume in the first slot of the shared global memory;

wherein allocating the second slot of the shared global memory for the write operation comprises:

determining that the first slot of the shared global memory has a slot type of version write pending;

in response to determining that the first slot of the shared global memory has a slot type of version write pending, setting a slot type of the second slot of the shared global memory to version write pending;

accepting data of the write operation into the second slot with the slot type set to version write pending slot; and converting the slot type of the first slot of the shared global memory from version write pending to protected write pending.

14. The method of claim 13, wherein a slot type of version write pending identifies the slot as containing data that is write pending to its track, but the data on disk or a mix of on-disk and older slot data is owed to a snapshot copy of the source volume.

15. The method of claim 13, wherein a slot type of protected write pending identifies the slot as containing data that is owed only to a snapshot copy of the source volume, and does not hold any data owed to the track to which the PWP slot is bound.

16. The method of claim 13, wherein the track index table contains an entry for each track, each entry being configured to enable a maximum of N entries to be bound to the respective track in the track index table, N being an integer greater than two.

17. The method of claim 16, wherein allocating the second slot of the shared global memory for the write operation comprises:

determining that the maximum number of N slots have been bound to the track in the track index table;

in response to determining that the maximum number of N slots have been bound to the track in the track index table, initiating a real time-intercept process to copy current data from a selected one of the slots that is bound to the track in the track index table to a snapshot replication area; and accepting data of the write operation into the selected one of the slots.

* * * * *